US012684395B2

(12) United States Patent
Maamari et al.

(10) Patent No.: US 12,684,395 B2
(45) Date of Patent: Jul. 14, 2026

(54) DELAY STATUS REPORTING FOR EXTENDED REALITY (XR) MULTI-MODAL TRAFFIC

(71) Applicant: QUALCOMM Incorporated, San Diego, CA (US)

(72) Inventors: Diana Maamari, San Diego, CA (US); Linhai He, San Diego, CA (US); Huilin Xu, Temecula, CA (US); Mickael Mondet, Louannec (FR); Hyun Yong Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/501,476

(22) Filed: Nov. 3, 2023

(65) Prior Publication Data

US 2025/0150872 A1 May 8, 2025

(51) Int. Cl.
*H04W 24/10* (2009.01)
*H04W 24/08* (2009.01)
*H04W 28/02* (2009.01)

(52) U.S. Cl.
CPC ........... *H04W 24/10* (2013.01); *H04W 24/08* (2013.01); *H04W 28/0268* (2013.01)

(58) Field of Classification Search
CPC .. H04W 24/10; H04W 24/08; H04W 28/0268
USPC ......................................................... 370/252
See application file for complete search history.

(56) References Cited

U.S. PATENT DOCUMENTS

2016/0057649 A1* 2/2016 Kakadia ................ H04L 47/283
370/235

FOREIGN PATENT DOCUMENTS

CN 119603721 A * 3/2025 ........ H04W 56/0055
WO 2023245582 A1 12/2023

* cited by examiner

*Primary Examiner* — Christopher R Crompton
(74) *Attorney, Agent, or Firm* — Patterson & Sheridan, L.L.P.

(57) ABSTRACT

Certain aspects of the present disclosure provide a method for wireless communications at a user equipment (UE). The UE may generate a delay status report (DSR) for at least two traffic flows on different logical channels. The at least two traffic flows have a maximum synchronization threshold between each other. The DSR may include at least one remaining delay budget (RDB) parameter related to an RDB of at least one of a first traffic flow or a second traffic flow and the maximum synchronization threshold. The UE may transmit the DSR.

30 Claims, 14 Drawing Sheets

700

| Media Components | Maximum Synchronization Threshold | |
|---|---|---|
| Audio-tactile | Audio delay:<br>50 ms | Tactile delay:<br>25 ms |
| Visual-tactile | Visual delay:<br>15 ms | Tactile delay:<br>50 ms |
| Note 1:<br>For each media component, "delay" refers to the case where that media component is delayed compared to the other. | | |

As an example, this entry implies that we have to make sure that visual delay is less than 15 msec from the tactile delay to guarantee that the VR user will not notice any asynchrony

*FIG. 7*

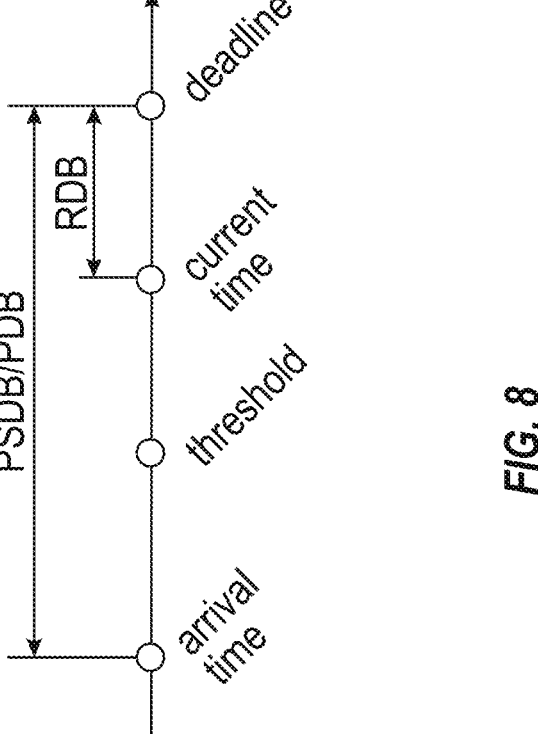
*FIG. 8*

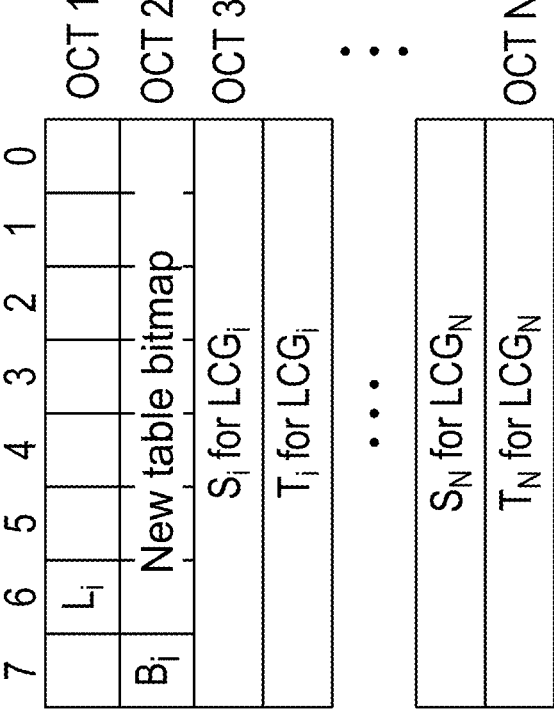
*FIG. 9*

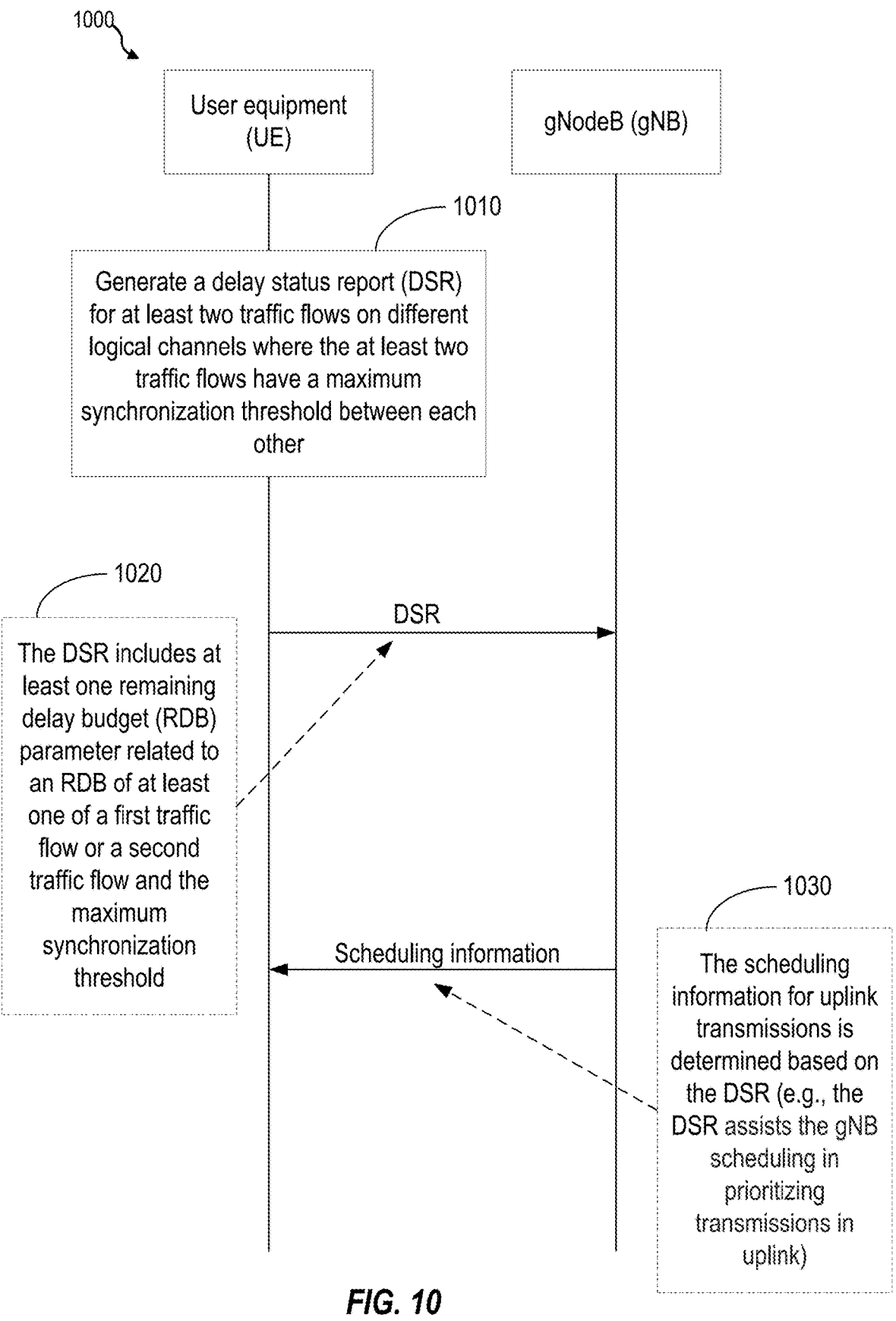

1000

User equipment
(UE)

gNodeB (gNB)

1010

Generate a delay status report (DSR)
for at least two traffic flows on different
logical channels where the at least two
traffic flows have a maximum
synchronization threshold between each
other

1020

The DSR includes at
least one remaining
delay budget (RDB)
parameter related to
an RDB of at least
one of a first traffic
flow or a second
traffic flow and the
maximum
synchronization
threshold

DSR

1030

Scheduling information

The scheduling
information for uplink
transmissions is
determined based on
the DSR (e.g., the
DSR assists the gNB
scheduling in
prioritizing
transmissions in
uplink)

FIG. 10

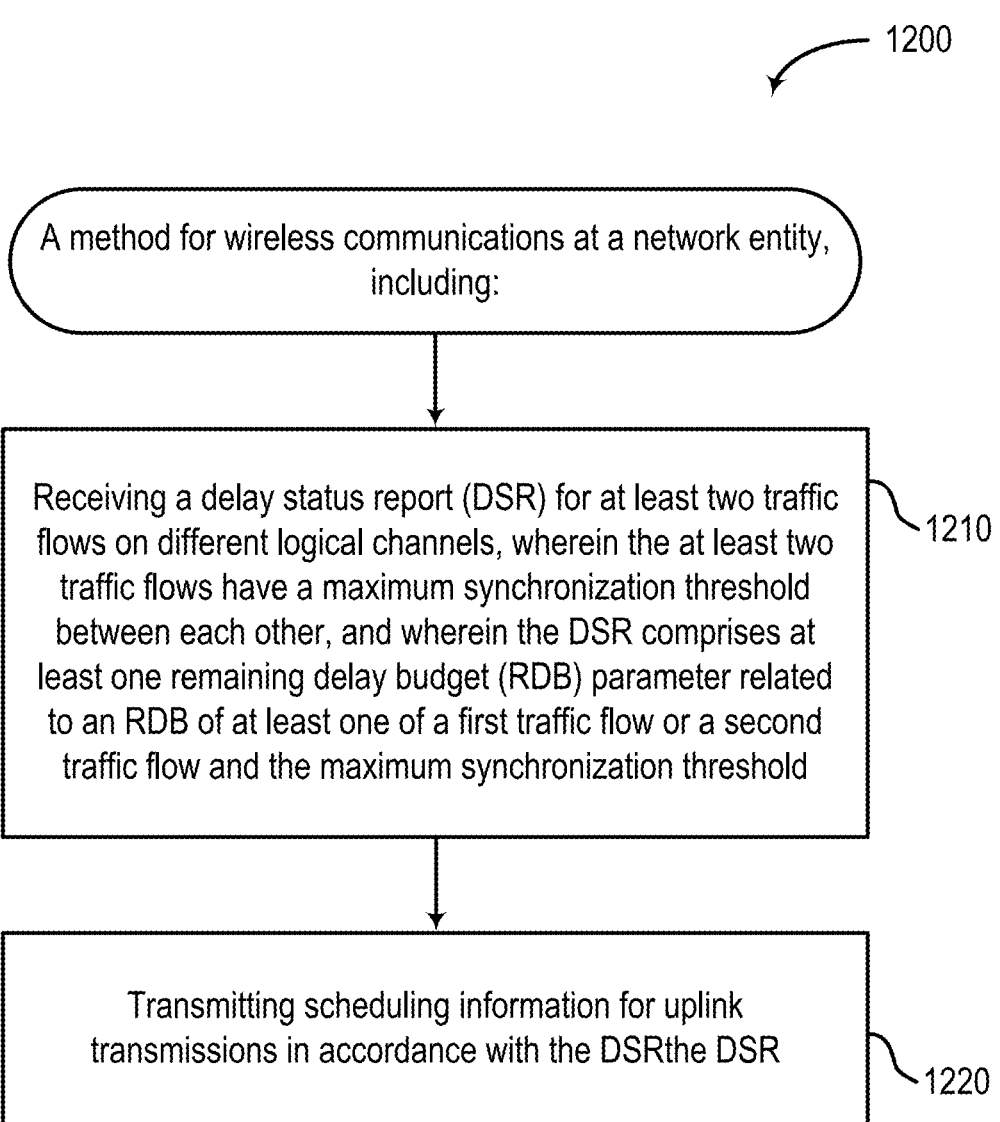

1200

A method for wireless communications at a network entity, including:

Receiving a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold

1210

Transmitting scheduling information for uplink transmissions in accordance with the DSRthe DSR

DELAY STATUS REPORTING FOR EXTENDED REALITY (XR) MULTI-MODAL TRAFFIC

BACKGROUND

Field of the Disclosure

Aspects of the present disclosure relate to wireless communications, and more particularly, to techniques for managing delay status reports (DSRs) for traffic flows associated with different media components of a multi-modal extended reality (XR) application.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes generating a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmitting the DSR.

Another aspect provides a method for wireless communications at a network entity. The method includes receiving a DSR for at least two traffic flows on different logical channels, wherein the at least two traffic flows have a maximum synchronization threshold between each other, and wherein the DSR comprises at least one RDB parameter related to an RDB of at least one of a first traffic flow or a second traffic flow and the maximum synchronization threshold; and transmitting scheduling information for uplink transmissions in accordance with the DSR.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 7 depicts example maximum synchronization thresholds between different media components of multi-modal XR traffic.

FIG. 8 depicts example value of a remaining delay budget (RDB).

FIG. 9 depicts example content of a delay status report (DSR).

FIG. 10 depicts a call flow diagram illustrating example communication among a UE and a network entity.

FIG. 12 depicts a method for wireless communications at a network entity.

DETAILED DESCRIPTION

Figure 1:
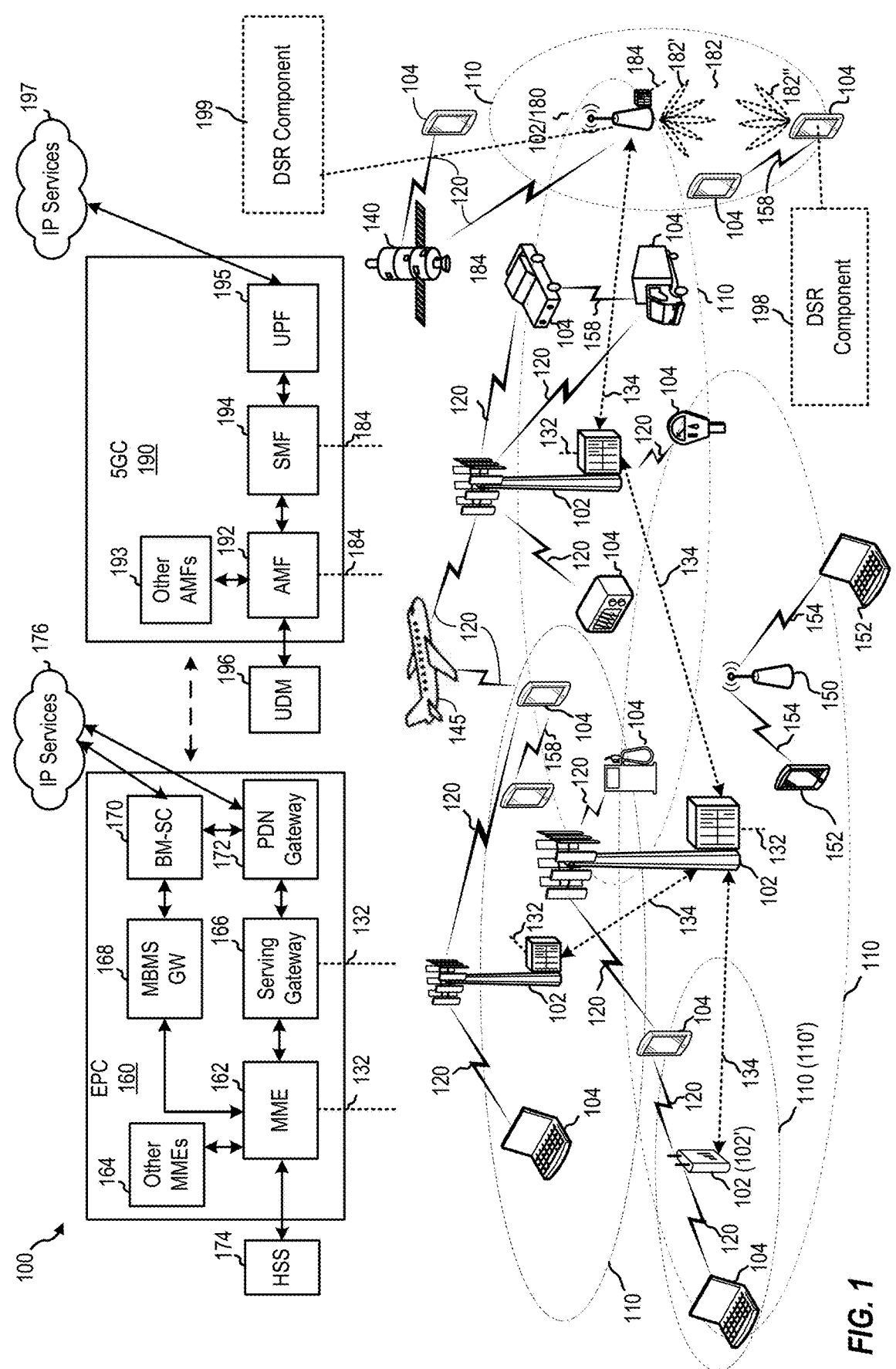
FIG. 1 depicts an example wireless communications network.

Aspects of the present disclosure provide apparatuses, methods, processing systems, and computer-readable mediums for managing delay status reports (DSRs) in a multi-modal extended reality (XR) system.

XR refers to all real-and-virtual combined environments and human-machine interactions generated by computer technology and wearables. XR is an umbrella term for different types of realities such as: virtual reality (VR), which aims at giving a user the feeling of being physically and spatially there; augmented reality (AR), which provides the user with additional content overlaid upon their environment; and mixed reality (MR), which is an advanced form of the AR where some virtual elements are inserted and can be interacted with.

A multi-modal XR application enable interactions that may combine ultra-low latency with extremely high availability. In the multi-modal XR application, there can be different modalities affecting the experience of the user such as video/audio media; information perceived by sensors about the environment such as brightness, temperature; and haptic data such as feelings when touching a surface (e.g., pressure, texture).

In some cases, as asynchrony between the different modalities of the multi-modal XR application may increase, a sense of realism for the user may decrease. To address this issue, there have been some efforts in the field of multi-modal-interaction systems regarding the detection of synchronization thresholds for visual, auditory, tactile modalities. For example, as to visual-tactile synchronization threshold for the multi-modal XR application, the user may not reliably detect the asynchrony if haptic data associated with the multi-modal XR application was presented to the user less than X ms (e.g., 50 ms) after the view of the contact with an object. The asynchrony tolerated for the haptic data before visual data associated with the multi-modal XR application was instead Y ms (e.g., 15 ms).

A gNodeB (gNB) may configure a user equipment (UE) executing the multi-modal XR application to report any experienced delay of data packets associated with the multi-modal XR application via a delay status report (DSR). For example, the DSR may indicate a remaining time for the data packets based on a packet data convergence protocol (PDCP) discard timer value. Presently, the DSR does not take into account a synchronization threshold associated with two media components (e.g., audio and tactile components) for the multi-modal XR application. Accordingly, when the UE may report a remaining delay budget (RDB) for the data packets associated with the multi-modal XR application in the DSR, the RDB may not take into account the synchronization threshold. So, the reported RDB may not be precise, and a tighter deadline for the data packets based on the synchronization threshold may exist.

Aspects of the present disclosure provide techniques for generating DSRs for traffic flows associated with different media components of a multi-modal XR application. For example, in a scenario where the two traffic flows have a maximum synchronization threshold between each other to avoid any asynchrony for a user, a UE may generate the DSR for the two traffic flows that takes into account the maximum synchronization threshold between the two traffic flows.

Particular aspects of the subject matter described in this disclosure can be implemented to realize one or more of the following potential advantages. In some examples, the described techniques may reduce the asynchrony between the different media components of the multi-modal XR application that can lead to smoother and more natural communication service and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
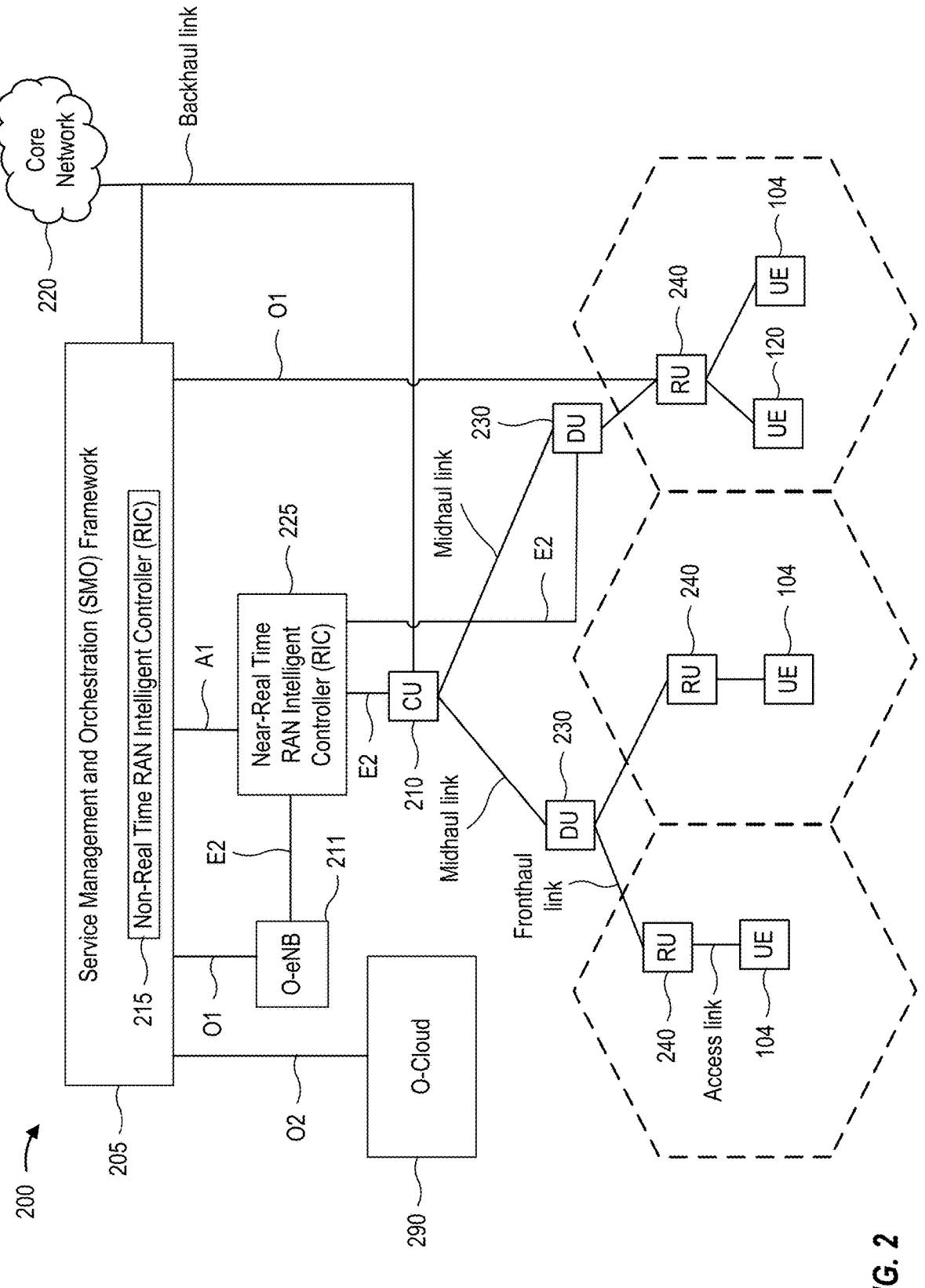
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (Rus), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 11:
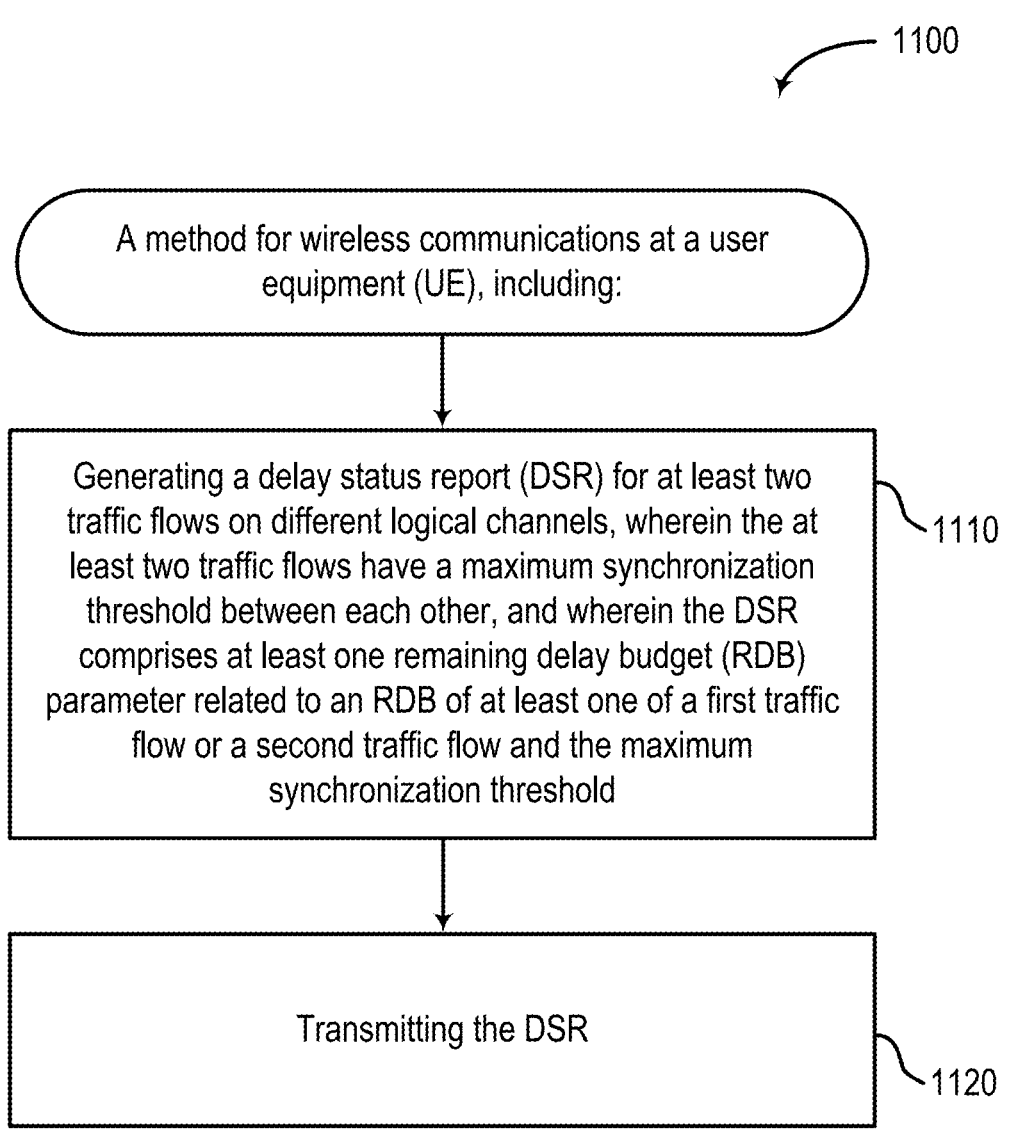
FIG. 11 depicts a method for wireless communications at a UE.

Wireless communication network 100 further includes delay status report (DSR) component 198, which may be configured to perform method 1100 of FIG. 11. Wireless communication network 100 further includes DSR compo- nent 199, which may be configured to perform method 1200 of FIG. 12.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 archi- tecture. The disaggregated BS 200 architecture may include one or more central units (Cus) 210 that can communicate directly with a core network 220 via a backhaul link, or indirectly with the core network 220 through one or more disaggregated BS units (such as a Near-Real Time (Near- RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or informa- tion (collectively, signals) via a wired or wireless transmis- sion medium. Each of the units, or an associated processor or controller providing instructions to the communications interfaces of the units, can be configured to communicate with one or more of the other units via the transmission medium. For example, the units can include a wired inter- face configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirec- tionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access chan- nel (PRACH) extraction and filtering, or the like), or both, based at least in part on the functional split, such as a lower layer functional split. In such an architecture, the RU(s) 240 can be implemented to handle over the air (OTA) commu- nications with one or more UEs 104. In some implementa- tions, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 inter- face). For virtualized network elements, the SMO Frame- work 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Addi- tionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and opti- mization of RAN elements and resources, Artificial Intelli- gence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
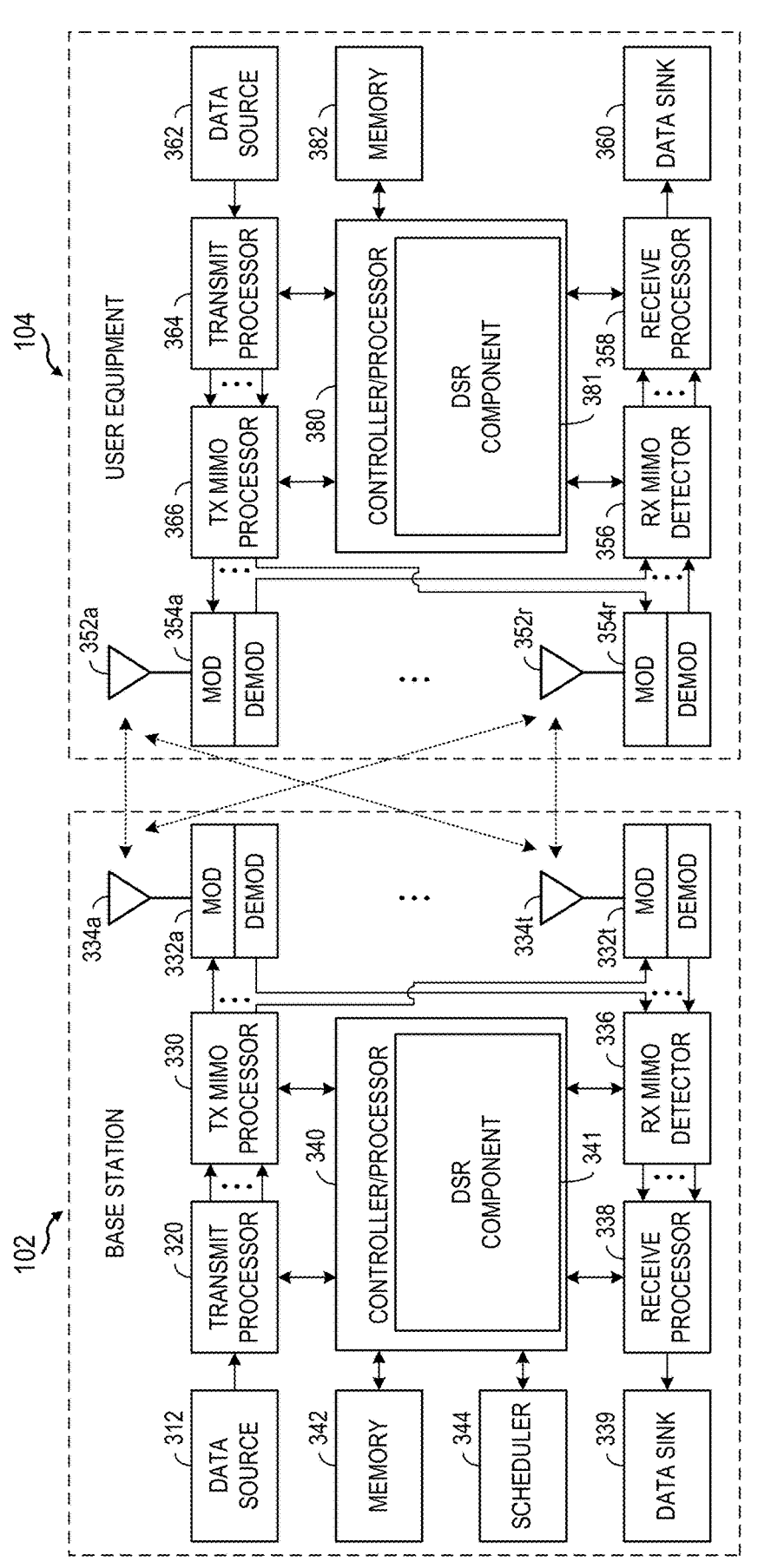
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes DSR component 341, which may be representative of DSR component 199 of FIG. 1. Notably, while depicted as an aspect of controller/processor 340, DSR component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes DSR component 381, which may be representative of DSR component 198 of FIG. 1. Notably, while depicted as an aspect of controller/processor 380, DSR component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figures 4A, 4B, 4C, 4D:
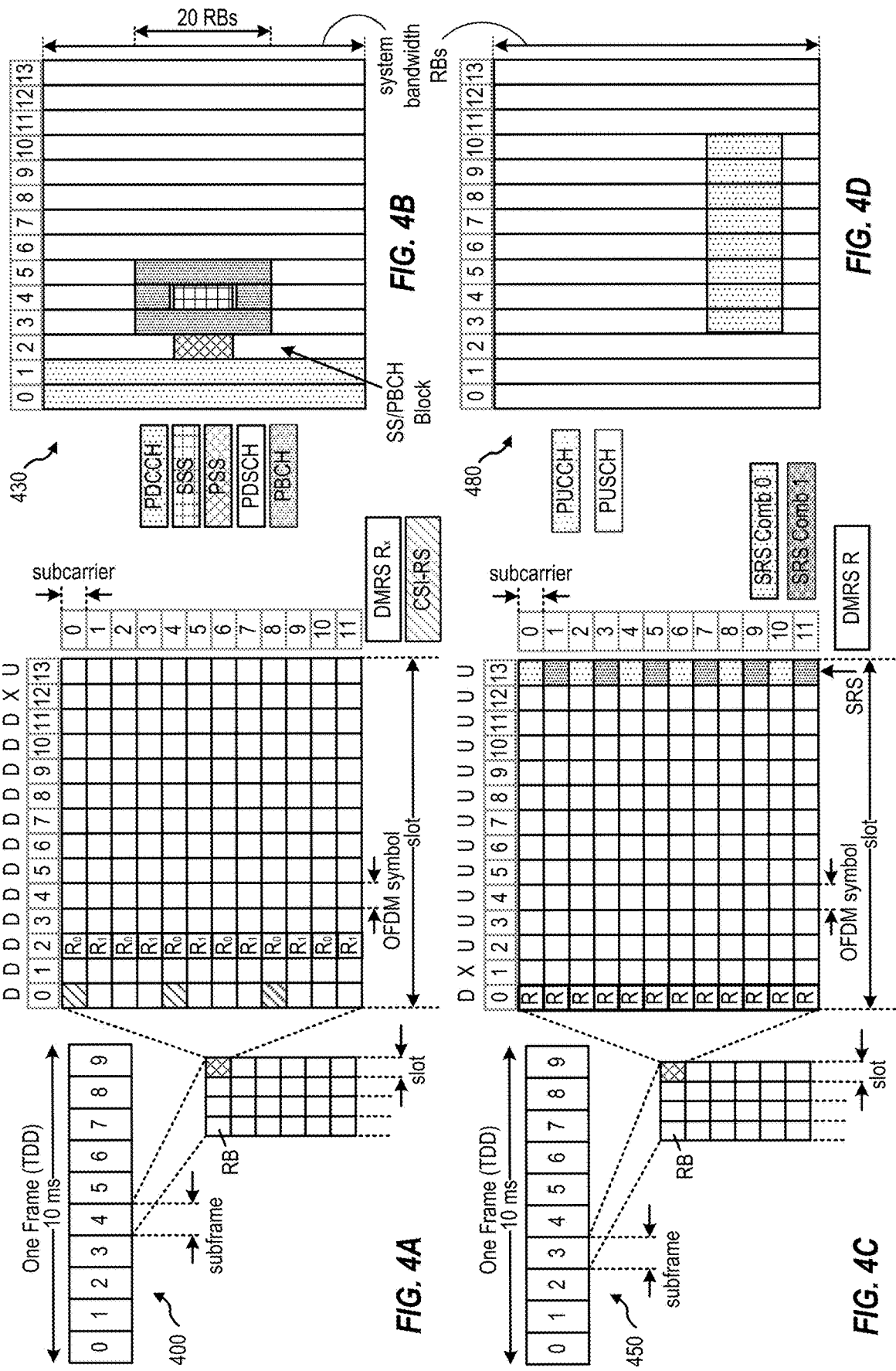
FIG. 4A, FIG. 4B, FIG. 4C, and FIG. 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as $3^{rd}$ generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Example Quality of Service (QOS)

Quality of service (QOS) refers to a measurement of overall performance of a service experienced by users of a network. To quantitatively measure QoS packet loss, bit rate, throughput, transmission delay, availability, etc. related aspects of the service are considered. QoS includes requirements on all aspects of a connection, such as service response time, loss, signal-to-noise ratio, crosstalk, echo, interrupts, frequency response, and/or loudness levels.

In 5G new radio (NR), QOS is enforced at a QoS flow level. Each QoS flow packets (e.g., data packets) are classified and marked using QoS flow identifier (QFI). For example, a first QoS flow is associated with video packets (e.g., WhatsApp video and Skype video) and a second QoS flow is associated with video streaming packets (e.g., YouTube video stream). The one or more QoS flows are mapped in an access network to one or more data radio bearers (DRBs). For example, a DRB transports packets of an evolved packet system (EPS) bearer between a user equipment (UE) and a network entity.

Within the 5G network, 5G QoS identifier (5QI) mechanism may be used in which packets are classified into different QoS classes. In this way, the QoS can be tailored to specific requirements. Each QoS class has its own assigned QoS characteristics (e.g., such as packet delay and packet loss). Accordingly, some packets can get better QoS than other packets.

The network entity maps individual QoS flows to one or more DRBs. A protocol data unit (PDU) session may contain multiple QoS flows and several DRBs. For example, the PDU session provides end-to-end user-plane connectivity between the UE and a specific data network through user-plane function (UPF). The PDU session supports one or more QoS flows, and a DRB transports the one or more QoS flows.

The network entity provides the UE with one or more QoS flow descriptions associated with the PDU session at the PDU session establishment or at the PDU session modification. Each QoS flow description may include a) a QFI; b) if the QoS flow is a guaranteed bit rate (GBR) QoS flow: 1) guaranteed flow bit rate (GFBR) for uplink, 2) GFBR for downlink, 3) maximum flow bit rate (MFBR) for uplink, 4) MFBR for downlink and/or 5) averaging window applicable for both uplink and downlink, or if the QoS flow is a non-GBR QoS flow: 1) reflective QoS attribute (RQA) in downlink and/or 2) additional QoS flow information; c) 5G QoS identifier (5QI) if the QFI is not the same as the 5QI of the QoS flow identified by the QFI; d) allocation and retention priority (ARP), and/or e) an EPS bearer identity (EBI) if the QoS flow can be mapped to an EPS bearer. All packets belonging to a specific QoS flow has a same 5QI.

The network entity provides the UE with QoS rules associated with the PDU session. The QoS rules may be provided at the PDU session establishment or at the PDU session modification. Each QoS rule includes an indication of whether the QoS rule is a default QoS rule, a QoS rule identifier (QRI), a QFI, a set of packet filters, and/or a precedence value.

Example Layer 2 (L2) of New Radio (NR) Protocol Stock

New radio (NR) radio protocol stack has two categories: 1) control-plane stack, and 2) user-plane stack. If data corresponds to signaling or controlling message, then the data is sent through the control-plane. User data is sent through the user-plane.

Figure 5:
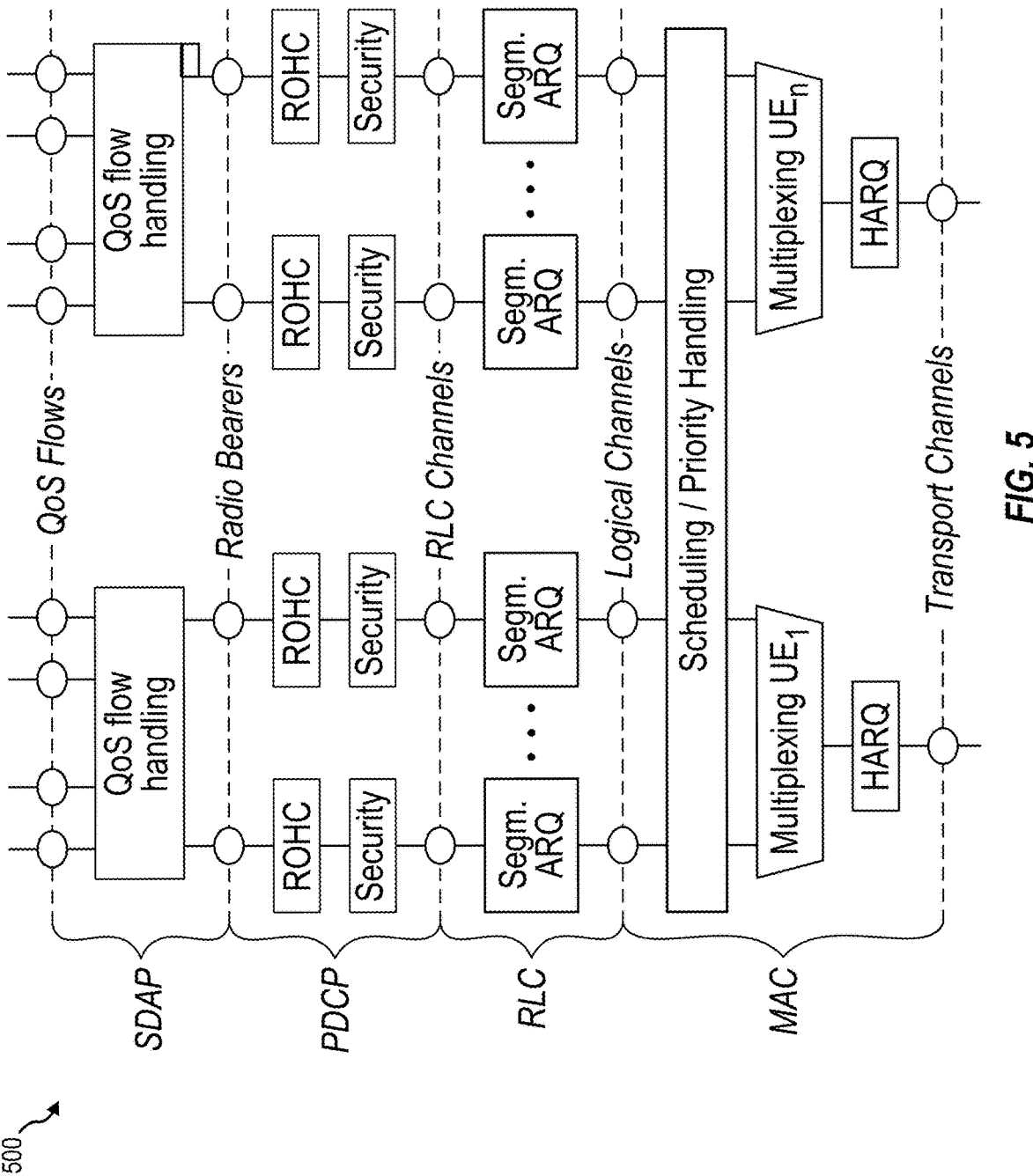
FIG. 5 depicts example layer 2 (L2) architecture.

As illustrated in a diagram 500 of FIG. 5, user-plane protocol stock (e.g., layer 2 (L2)) of NR is split into sub layers such as a service data adaptation protocol (SDAP) layer, a packet data convergence protocol (PDCP) layer, a radio link control (RLC) layer, and a medium access control (MAC) layer. In NR, carrier aggregation is supported, and data for each carrier may be processed independently in the SDAP layer, the PDCP layer, the RLC layer and is multiplexed in the MAC layer.

The SDAP layer may perform mapping between a quality of service (QOS) flow (e.g., associated with one or more data packets (e.g., protocol data units (PDUs)) and a data radio bearer (DRB) (e.g., due to QoS framework). The SDAP layer may also perform marking QoS flow ID (QFI) in both downlink and uplink packets (e.g., downlink due to reflective QoS and uplink due to QoS framework). A single protocol entity of SDAP is configured for each individual protocol data unit (PDU) session.

The PDCP layer may perform header compression and decompression of internet protocol (IP) data (e.g., robust header compression (ROHC)), maintain PDCP sequence numbers (SNs), perform in-sequence delivery of upper layer PDUs at re-establishment of lower layers, perform reordering and eliminate duplicates of lower layer service data units (SDUs), execute PDCP PDU routing for the case of split bearers, execute retransmission of lower layer SDUs, cipher and decipher control plane and user-plane data, perform integrity protection and integrity verification of control plane and user plane data, control timer-based discard of data, and perform security operations (e.g., ciphering, deciphering, integrity protection, integrity verification, etc.).

The RLC layer may operate in a plurality of modes of operation including transparent mode (TM), unacknowledged mode (UM), and acknowledged mode (AM). The RLC layer may perform transfer of upper layer PDUs error correction through automatic repeat request (ARQ) for AM data transfers, and segmentation and reassembly of RLC SDUs for UM and AM data transfers. The RLC layer may maintain SNs independent of the ones in PDCP for UM and AM data transfers. The RLC layer may perform resegmentation of RLC data PDUs for AM data transfers, detect duplicate data for AM data transfers, discard RLC SDUs for UM and AM data transfers, detect protocol errors for AM data transfers, and/or perform RLC re-establishment.

The MAC layer may perform mapping between logical channels and transport channels, multiplexing of MAC SDUs from one or more logical channels onto transport blocks (TB) to be delivered to a physical layer (PHY) via transport channels, de-multiplexing MAC SDUs to one or more logical channels from TB delivered from the PHY via the transport channels, scheduling information reporting, error correction through hybrid automatic repeat request (HARQ), priority handling between UEs by means of dynamic scheduling, priority handling between logical channels of one UE by means of logical channel prioritization, and/or padding.

Example Extended Reality (XR) Applications

Extended reality (XR) refers to all real-and-virtual combined environments and human-machine interactions generated by computer technology and wearables. XR is an umbrella term for different types of realities such as: virtual reality (VR), which aims at giving a user the feeling of being physically and spatially there; augmented reality (AR), which provides the user with additional content overlaid upon their environment; and mixed reality (MR), which is an advanced form of AR where some virtual elements are inserted and can be interacted with. In all cases, XR content is generated by XR engines, which may include a rendering engine for graphics, an audio engine for sound, and a physics engine for emulating the laws of physics.

An XR experience may require frame rates of at least 60 framespersecond (fps) and 2K resolution per eye, while a truly immersive experience may require 90 or even 120 fps with resolutions up to 8K per eye to remove graphics pixilation. This translates into bit rates of tens of megabits per second (Mbps). In some cases, creating content at such bit rates requires powerful XR engines which cannot be hosted on a user equipment (UE), for instance due to heat dissipation and battery constraints. So, in some cases, the rendering may be assisted or split across a network, that is, the UE sends real-time sensor data in uplink to the cloud, which then performs rendering and produces the multimedia data which is sent back to the UE for display in downlink.

In some cases, an XR application generates and consumes in data units, which are larger (e.g., in size) than internet protocol (IP) packets (e.g., data packets). The data units are called protocol data unit (PDU) sets. A PDU set is also known as an application data unit (ADU). The PDU sets are segmented into the data packets when the PDU sets are transmitted over a core network (CN). In some cases, the data packets of each PDU set arrive at a receiver around a same time. In some other cases, the data packets of each PDU set may not arrive at the same time at the receiver. All data packets in a PDU set may have same quality of service (QOS) requirements.

There are two types of PDU sets. One type of the PDU set is called a type-A PDU set, and another type of the PDU SET is called a type-B PDU set. With regards to the type-A PDU set (e.g., all or nothing PDU set), if any data packet in the type-A PDU set is lost (e.g., during transmission) or misses a deadline (e.g., associated with its QoS requirements), then remaining data packets in the type-A PDU set become useless. With regards to the type-B PDU set, a reception of the type-B PDU set is considered to be successful when a decoding criterion is met (e.g., a predetermined number of data packets or bytes of the type-B PDU set are received).

Example Extended Reality (XR) Multi-Modal Traffic

Extended reality (XR) multi-modal applications enable interactions that may combine ultra-low latency with extremely high availability, reliability and security. For example, tactile applications can be applied in multiple fields, including: industry, robotics and telepresence, virtual reality (VR), augmented reality (AR), healthcare, road traffic, serious gaming, smart grid, etc. Multiple modalities can be used in combination in a service to provide complementary methods that may convey redundant information but can convey information more effectively. With the benefit of combining input from more than one source and/or output to more than one destination, interpretation in communication services will be more accurate and faster, response can also be quicker, and the communication service will be smoother and more natural.

For a tactile and multi-modal communication application, there can be different modalities affecting the user experience, e.g., video/audio media; information perceived by sensors about the environment such as brightness, temperature, humidity, etc.; haptic data can be feelings when touching a surface (e.g., pressure, texture, vibration, temperature); and/or kinaesthetic senses (e.g. gravity, pull forces, sense of position awareness).

In some cases, multiple modalities can be transmitted at a same time to multiple application servers for further processing in a coordinated manner, in terms of quality of service (QOS) coordination, traffic synchronization, power saving, etc.

In some cases, multiple outcomes may be generated as a feedback. In the scenario of real time remote VR service, a VR user may use a plurality of independent user equipments (UEs) to separately collect video, audio, and haptic data, and to receive video, audio, and haptic feedback from one or multiple application servers for a same VR application. In this case, an end user may wear VR glasses (e.g., a first UE) to receive images and sounds, and a (touch) glove (e.g., a second UE) to receive a touch sensation, a camera to collect video inputs, a microphone to collect audio inputs, multiple wearable sensors to provide haptic information and environmental information associated to the user.

In some cases, the multiple outcomes may need to reach the UEs at a very same time. In the scenario of sound field reappearing, different channels of sounds are sent to the distributed sound boxes to simulate the sound from a particular direction. A small time difference may cause big direction error to impact user experience.

The XR multi-modal applications may involve a big number of UEs at a long distance. In the scenario of multi-modal telepresence, the UEs may need synchronization for time, control signal and visual signal.

Immersive multi-modal VR application describes the case of a user interacting with virtual entities in a remote environment such that the perception of interaction with a real physical world is achieved. Users are supposed to perceive multiple senses (e.g., vision, sound, touch) for full immersion in the virtual environment. The degree of immersion achieved indicates how real the created virtual environment is. Even a tiny error in the preparation of the remote environment might be noticed, as users are quite sensitive when using immersive the multi-modal VR applications. So, a high-field virtual environment (e.g., high-resolution images and stereo audio) may be needed to achieve an ultimately immersive experience.

One of the major objectives of VR designers is to obtain more realistic and compelling virtual environments. As asynchrony between the different modalities increases, users' sense of presence and realism will decrease. There have been efforts in multi-modal-interaction research regarding the detection of synchronization thresholds regarding visual, auditory and tactile modalities. For example, as to visual-tactile synchronization threshold, the VR user may not reliably detect the asynchrony if a haptic feedback was presented less than X ms (e.g., 50 ms) after the view of the contact with an object. The asynchrony tolerated for the haptic feedback before a visual feedback was instead Y ms (e.g., 15 ms).

Figure 6:
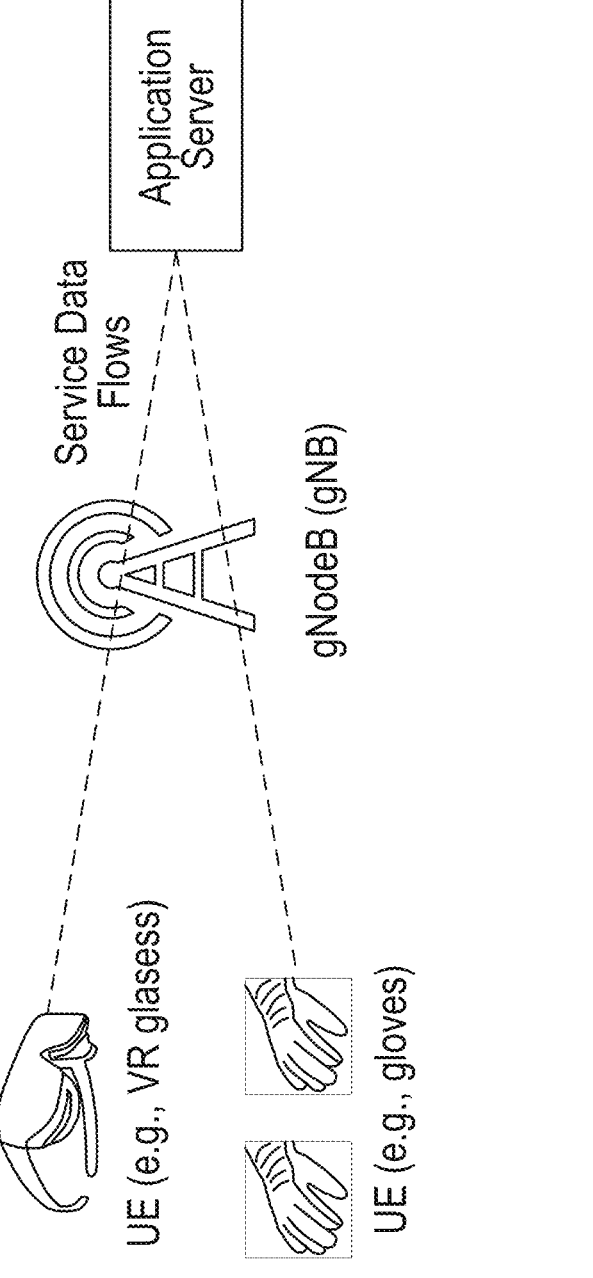
FIG. 6 depicts example system illustrating multi-modal extended reality (XR) traffic.

As illustrated in a diagram 600 of FIG. 6, UEs for the immersive multi-modal VR application may include multiple types of devices such as a VR glass type device, gloves and other potential devices that support haptic and/or kinaesthetic modal. These UEs are connected to at least one application server via a 5G network without any UE relays.

An user utilizes the UEs of FIG. 6 to experience the immersive multi-modal VR application. For example, the user powers on the UEs to connect to the application server. The user then starts a gaming application. During a gaming application running period, the UEs periodically send sensing information to the application server, including: haptic data which is generated by the gloves, and sensing data such as positioning and view data which is generated by the VR glasses. In some cases, the UEs may send the haptic data and the sensing data with different periodic time to the application server. For example, the haptic data and the sensing data may be transferred via two separate service data flows (or traffic flows).

The application server performs necessary process operations on immersive game reality including rendering and coding the received data (such as the video, the audio and haptic model data) from the UEs. The application server then periodically sends downlink data to the UEs, with different time periods respectively. In some cases, the application server may also send the haptic data and the video/audio data with different periodic time to the UEs. For example, the haptic data and the audio/video data may be transferred via two separate service data flows to the UEs. The UEs receive the data from the application server and present the related sensing including video, audio and haptic to the user.

In some cases, to obtain more realistic and compelling virtual environments for the user, network assistance may be needed to ensure synchronization thresholds between different modal data. For example, due to separate handling of multiple media components (such as audio and video components) in some XR applications, 5G system may cater for audio-video data synchronization in order to avoid having a negative impact on the user experience (i.e., users detecting lack of synchronization). To support XR environments, the 5G system may support audio-video data synchronization thresholds in the range of [125 ms to 5 ms] for audio delayed and in the range of [45 ms to 5 ms] for audio advanced.

In some cases, applying synchronization thresholds may be helpful in support of the immersive multi-modal VR application when the synchronization threshold between two or more modalities is less than a latency key performance indicator (KPI) for the multi-modal VR application. Example synchronization thresholds for different media components are depicted in table 700 of FIG. 7.

Example Delay Status Report (DSR) for Extended Reality (XR) Applications

For extended reality (XR) applications, a user equipment (UE) may report experienced delay of data packets during transmission process via a delay status report (DSR). The UE may calculate a remaining time for the data packets based on a packet data convergence protocol (PDCP) discard timer value. The UE may determine a reference time for the remaining time of the data packets from a point of a first transmission of the data packets.

In some cases, a gNodeB (gNB) configures which logical channels or logical channel groups (e.g., each logical channel group includes multiple logical channels) have to report the DSR. In one example, the reporting of the DSR can be triggered based on an event. For instance, the gNB configures a reporting threshold on a remaining delay budget (RDB) for the data packets in each logical channel. In such cases, the DSR is triggered when a minimum RDB among all the data packets in the logical channel is below the reporting threshold. As illustrated in a diagram 800 of FIG. 8, the RDB may be determined based on a current time and a deadline for the data packets.

In another example, the reporting of the DSR can be triggered based on a timer (e.g., which may be configured per logical channel). For instance, the gNB configures a periodic DSR timer. In such cases, an expiry of the DSR timer triggers the reporting of the DSR.

In some cases, the triggered DSR remains pending until its DSR medium access control (MAC) control element (CE) is included in a physical uplink shared channel (PUSCH). In some cases, a pending DSR may trigger a scheduling request (SR) until the pending DSR is canceled.

As illustrated in a diagram 900 of FIG. 9, the DSR may include a bit map indicating which logical channel groups the UE is reporting. $S_i$ indicates an amount of data in a reported LCG at a sampling instance. $T_i$ indicates a duration between the sampling instance and a transmission time of the DSR in a physical uplink shared channel (PUSCH). In unit of slots, a maximum value of the $T_i$ may be equal to 32 ms×8 slot/ms. There are multiple options for determining the sampling instance. In a first option, the sampling instance is a slot when the DSR was triggered. In another option, the sampling instance is a slot when a MAC protocol data unit (PDU) containing the DSR is assembled.

Currently, the DSR does not take into account a synchronization threshold associated with two media components (e.g., audio and tactile components) for a multi-modal XR application. So, when the UE reports the RDB for data packets associated with the multi-modal XR application in the DSR, the RDB may not take into account the synchronization threshold. In some cases even when the RDB is reported, a tighter deadline for the data packets based on the synchronization threshold might exist.

For example, the multi-modal XR application may be associated with two traffic flows such as a first traffic flow (e.g., for audio media components) and a second traffic flow (e.g., for tactile media components). The first traffic flow and the second traffic flow may include protocol data units (PDUs) or PDU sets that need to be delivered with a maximum synchronization threshold (or error) associated with the first traffic flow and the second traffic flow. In this case, when the first traffic flow has a deadline at time T1, the second traffic flow has a deadline at time T2, and the maximum synchronization threshold between the first traffic flow and the second traffic flow is time D; then when the difference between T2 and T1 is larger than D, a deadline for the second traffic flow needs to be changed to T1+D. In some cases, a priority for different traffic flows may still be determined separately for each logical channel carrying the different traffic flows based on T1+D rather than on T2. So, a reference time for reporting RDB for the first traffic flow may not always be based on a start of transmission of data packets of the first traffic flow, but can also be dictated based on a deadline of the second traffic flow.

Aspects Related to Enhancements to Delay Status Reporting for XR Multi Modal Traffic Aspects of the present disclosure provide apparatuses, methods, processing systems, and computer-readable mediums for generating delay status reports (DSRs) for traffic flows associated with different media components of a multi-modal extended reality (XR) application. For example, in a scenario where two traffic flows have a maximum synchronization threshold between each other to avoid any asynchrony for a user, a user equipment (UE) may generate the DSR for the two traffic flows that takes into account the maximum synchronization threshold between the two traffic flows.

Particular aspects of the subject matter described in this disclosure can be implemented to realize one or more of the following potential advantages. In some examples, the described techniques may reduce the asynchrony between the different media components of the multi-modal XR application that can lead to smoother and more natural communication service and user experience.

The techniques proposed herein for managing the content of the DSR may be understood with reference to FIG. 10-FIG. 14.

FIG. 10 depicts a call flow diagram 1000 illustrating example communication among a UE and a network entity (e.g., a gNB) for generating one or more DSRs. The UE shown in FIG. 10 may be an example of the UE 104 depicted and described with respect to FIG. 1 and FIG. 3. The gNB depicted in FIG. 10 may be an example of the BS 102 depicted and described with respect to FIG. 1 and FIG. 3, or the disaggregated BS depicted and described with respect to FIG. 2.

As indicated at 1010, the UE generates at least one DSR for at least two traffic flows on different logical channels. The at least two traffic flows may include a first traffic flow and a second traffic flow that may have a maximum synchronization threshold between each other.

Each traffic flow includes data packets belonging to one or more protocol data units (PDUs) or one or more PDU sets. The first traffic flow includes a first set of data packets of a first data type (e.g., visual data type). The second traffic flow includes a second set of data packets of a second data type (e.g., tactile data type).

The maximum synchronization threshold indicates a maximum allowable delay time for delivery of a set of data packets of one traffic flow with respect to delivery of a set of data packets of another traffic flow. For example, a first logical channel may carry PDUs of the first traffic flow and a second logical channel may carry PDUs of the second traffic flow that need to be delivered within the maximum synchronization threshold (e.g., visual and tactile data packets/media components to be delivered within the 15 msec of each other).

The DSR includes at least one remaining delay budget (RDB) parameter related to an RDB of at least one of a first traffic flow or a second traffic flow and the maximum synchronization threshold.

As indicated at 1020, the UE transmits the DSR to the gNB. In one example, the DSR may include a first RDB for the first traffic flow and a second RDB for the second traffic flow. The first RDB indicates a first duration of remaining delay time for delivery of the first set of data packets of the first traffic flow, and the second RDB indicates a second duration of remaining delay time for delivery of the second set of data packets of the second traffic flow.

In another example, the DSR may include the first RDB for the first traffic flow, and the first RDB and the maximum synchronization threshold for the second traffic flow. In this example case, an RDB for the second traffic flow is determined based on the first RDB and the maximum synchronization threshold.

In another example, the DSR may only include the first RDB for the first traffic flow. In this example case, an RDB for the second traffic flow may be implicitly determined based on the first RDB.

In another example, the DSR may only include the second RDB for the second traffic flow. In this example case, an RDB for the first traffic flow may be implicitly determined based on the second RDB.

In certain aspects, a reference time for a remaining delay time reported in the DSR may not only be determined from a point of a first transmission of data packets from the first logical channel, but can alternatively be determined from the point of the first transmission of the data packets from the second logical channel and the maximum synchronization threshold to cover the case that where a minimum of (the second RDB, T1+D)=T1+D. As noted above, the first traffic flow has a deadline at time T1, and the maximum synchronization threshold between the first traffic flow and the second traffic flow is time D.

In one example, a reference time for the first duration of remaining delay time (e.g., as indicated by the first RDB) is based on: a transmission time of the first set of data packets or a transmission time of the second set of data packets along with the maximum synchronization threshold.

In another example, a reference time for the second duration of remaining delay time (e.g., as indicated by the second RDB) is based on: a transmission time of the second set of data packets or a transmission time of the first set of data packets along with the maximum synchronization threshold.

As indicated at 1030, the gNB transmits to the UE scheduling information for uplink transmissions based on the DSR (e.g., the DSR assists the gNB scheduling in prioritizing transmissions in uplink).

In certain aspects, the DSR received by the gNB may only include the first RDB for the first traffic flow on the first logical channel, and in such cases, a scheduling time of data packets of the second traffic flow on the second logical channel is less than a value of the maximum synchronization threshold from a scheduling time of data packets of the first traffic flow on the first logical channel. For example, when the UE does not report any delay information for the second logical channel of an associated logical channel, then the gNB may assume that the second logical channel needs to be scheduled less than the maximum synchronization threshold from the first logical channel. In such cases, a size of a medium access control (MAC) control element (CE) may also be reduced since it does not need to report the DSR for each logical channel. The gNB and the UE may have a same understanding on missing delay information of any logical channel in the DSR.

In certain aspects, the UE may transmit a separate buffer status report (BSR) for each of the logical channels or a single BSR for all the logical channels to the gNB. For example, the BSR may be reported separately for the different logical channels even when such logical channels are associated with each other by carrying different types of the data packets that need to be delivered within the maximum synchronization threshold. Alternatively, buffer status information for the multiple logical channels can be combined into a same report.

In certain aspects, the data packets from the different traffic flows (e.g., multi-modal quality of service (QOS) flows, such as haptic and video traffic flows) on the different logical channels may have different reliability requirements. In such cases, it may be useful to transmit the separate BSR for each of the logical channels in separate physical uplink shared channel (PUSCH) occasions, as the reporting of the separate BSRs for the logical channels is useful to obtain different PUSCH grants from the gNB.

In certain aspects, when the UE is configured with a multi-modal service identification (ID) (or any equivalent association by the gNB) that associates the different logical channels to each other in an uplink operation, then the UE may use the techniques described herein to generate and transmit the DSR. Otherwise the UE may compute the RDB from a legacy reference time, which is from a start of the transmission of data packets of a same logical channel.

Example Method for Wireless Communications at a
User Equipment (UE)

FIG. 11 shows an example of a method 1100 for wireless communications at a user equipment (UE), such as the UE 104 of FIG. 1 and FIG. 3.

Method 1100 begins at step 1110 with generating a delay status report (DSR) for at least two traffic flows on different logical channels where the at least two traffic flows have a maximum synchronization threshold between each other, and where the DSR includes at least one remaining delay budget (RDB) parameter related to an RDB of at least one of a first traffic flow or a second traffic flow and the maximum synchronization threshold. In some cases, the operations of this step refer to, or may be performed by, circuitry for generating and/or code for generating as described with reference to FIG. 13.

Method 1100 then proceeds to step 1120 with transmitting the DSR. In some cases, the operations of this step refer to, or may be performed by, circuitry for transmitting and/or code for transmitting as described with reference to FIG. 13.

In certain aspects, the at least one RDB parameter includes at least one of: a first RDB for the first traffic flow on a first logical channel; the first RDB and the maximum synchronization threshold; a second RDB for the second traffic flow on a second logical channel; or the second RDB and the maximum synchronization threshold.

In certain aspects, the maximum synchronization threshold indicates a maximum allowable delay time for delivery of a set of data packets of one traffic flow of the at least two traffic flows with respect to delivery of a set of data packets of another traffic flow of the at least two traffic flows.

In certain aspects, each traffic flow includes data packets belonging to at least one of: one or more protocol data units (PDUs) or one or more PDU sets.

In certain aspects, the first traffic flow includes a first set of data packets of a first data type; the second traffic flow includes a second set of data packets of a second data type; and the first data type is different from the second data type.

In certain aspects, the at least one RDB parameter includes a first RDB for the first traffic flow on a first logical channel, and a second RDB for the second traffic flow on a second logical channel is based on the first RDB.

In certain aspects, the at least one RDB parameter includes a second RDB for the second traffic flow on a second logical channel, and a first RDB for the first traffic flow on a first logical channel is based on the second RDB.

In certain aspects, the first RDB indicates a first duration of remaining time for delivery of a first set of data packets of the first traffic flow; and the second RDB indicates a second duration of remaining time for delivery of a second set of data packets of the second traffic flow.

In certain aspects, a reference time for the first duration of remaining time is based on: a transmission time of the first set of data packets or a transmission time of the second set of data packets along with the maximum synchronization threshold.

In certain aspects, a reference time for the second duration of remaining time is based on: a transmission time of the second set of data packets or a transmission time of the first set of data packets along with the maximum synchronization threshold.

In certain aspects, the at least one RDB parameter includes a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

In certain aspects, the method 1100 further includes transmitting a separate buffer status report (BSR) for each of the logical channels or a single BSR for all the logical channels.

Figure 13:
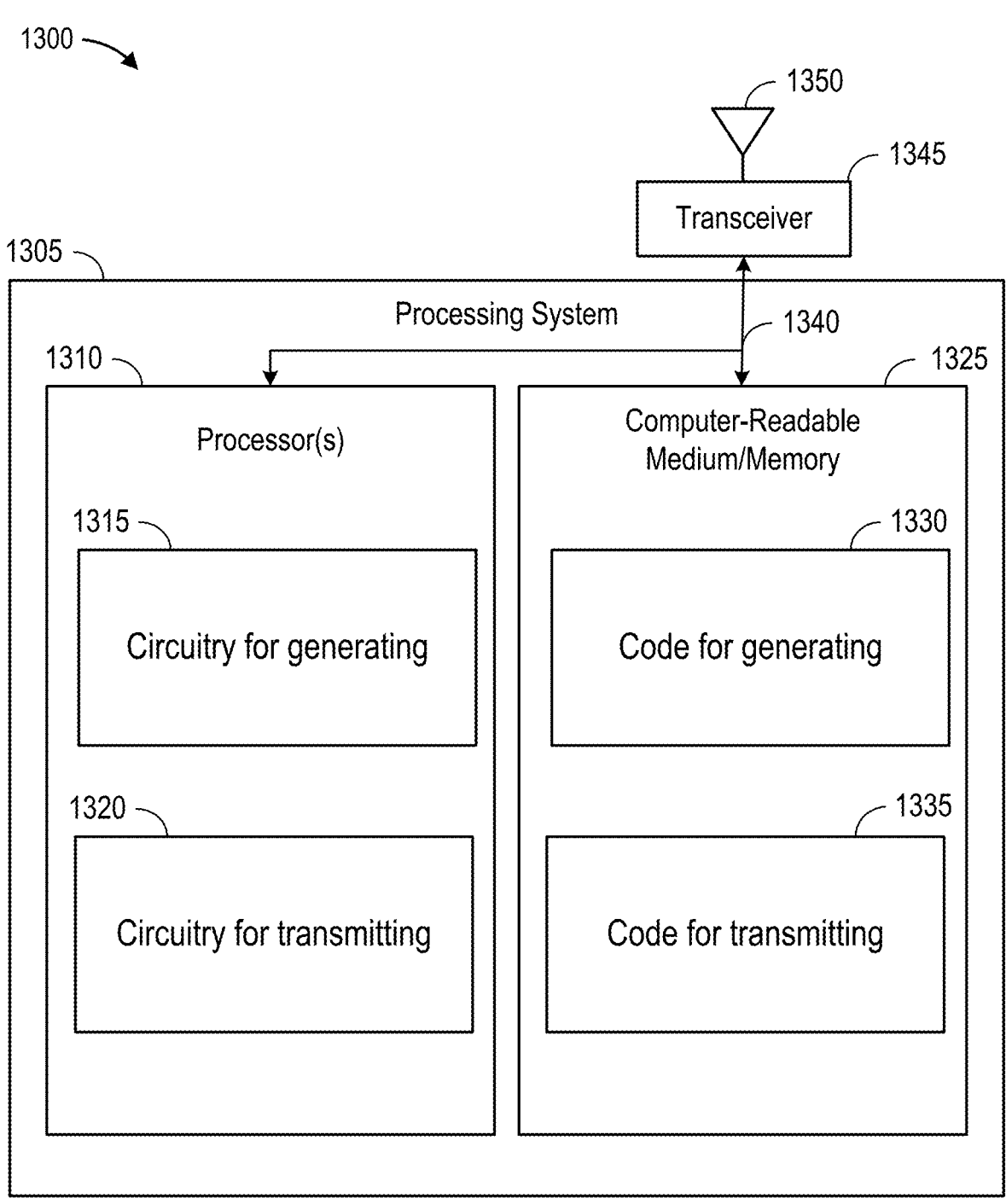
FIG. 13 and FIG. 14 depict example communications devices.

In one aspect, the method 1100, or any aspect related to it, may be performed by an apparatus, such as a communications device 1300 of FIG. 13, which includes various components operable, configured, or adapted to perform the method 1100. The communications device 1300 is described below in further detail.

Note that FIG. 11 is just one example of a method, and other methods including fewer, additional, or alternative steps are possible consistent with this disclosure.

Example Method for Wireless Communications at a Network Entity

FIG. 12 shows an example of a method 1200 for wireless communications at a network entity, such as the BS 102 of FIG. 1 and FIG. 3.

Method 1200 begins at step 1210 with receiving a delay status report (DSR) for at least two traffic flows on different logical channels where the at least two traffic flows have a maximum synchronization threshold between each other, and where the DSR includes at least one remaining delay budget (RDB) parameter related to an RDB of at least one of a first traffic flow or a second traffic flow and the maximum synchronization threshold. In some cases, the operations of this step refer to, or may be performed by, circuitry for receiving and/or code for receiving as described with reference to FIG. 14.

Method 1200 then proceeds to step 1220 with transmitting scheduling information for uplink transmissions in accordance with the DSR. In some cases, the operations of this step refer to, or may be performed by, circuitry for transmitting and/or code for transmitting as described with reference to FIG. 14.

In certain aspects, the at least one RDB parameter includes at least one of: a first RDB for the first traffic flow on a first logical channel; the first RDB and the maximum synchronization threshold; a second RDB for the second traffic flow on a second logical channel; or the second RDB and the maximum synchronization threshold.

In certain aspects, the maximum synchronization threshold indicates a maximum allowable delay time for delivery of a set of data packets of one traffic flow of the at least two traffic flows with respect to delivery of a set of data packets of another traffic flow of the at least two traffic flows.

In certain aspects, each traffic flow includes data packets belonging to at least one of: one or more protocol data units (PDUs) or one or more PDU sets.

In certain aspects, the first traffic flow includes a first set of data packets of a first data type; the second traffic flow includes a second set of data packets of a second data type; and the first data type is different from the second data type.

In certain aspects, the at least one RDB parameter includes a first RDB for the first traffic flow on a first logical channel, and a second RDB for the second traffic flow on a second logical channel is based on the first RDB.

In certain aspects, the at least one RDB parameter includes a second RDB for the second traffic flow on a second logical channel, and a first RDB for the first traffic flow on a first logical channel is based on the second RDB.

In certain aspects, the first RDB indicates a first duration of remaining time for delivery of a first set of data packets of the first traffic flow; and the second RDB indicates a second duration of remaining time for delivery of a second set of data packets of the second traffic flow.

In certain aspects, a reference time for the first duration of remaining time is based on: a transmission time of the first set of data packets or a transmission time of the second set of data packets along with the maximum synchronization threshold.

In certain aspects, a reference time for the second duration of remaining time is based on: a transmission time of the second set of data packets or a transmission time of the first set of data packets along with the maximum synchronization threshold.

In certain aspects, the at least one RDB parameter includes a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

In certain aspects, the method 1200 further includes receiving a separate buffer status report (BSR) for each of the logical channels or a single BSR for all the logical channels.

Figure 14:
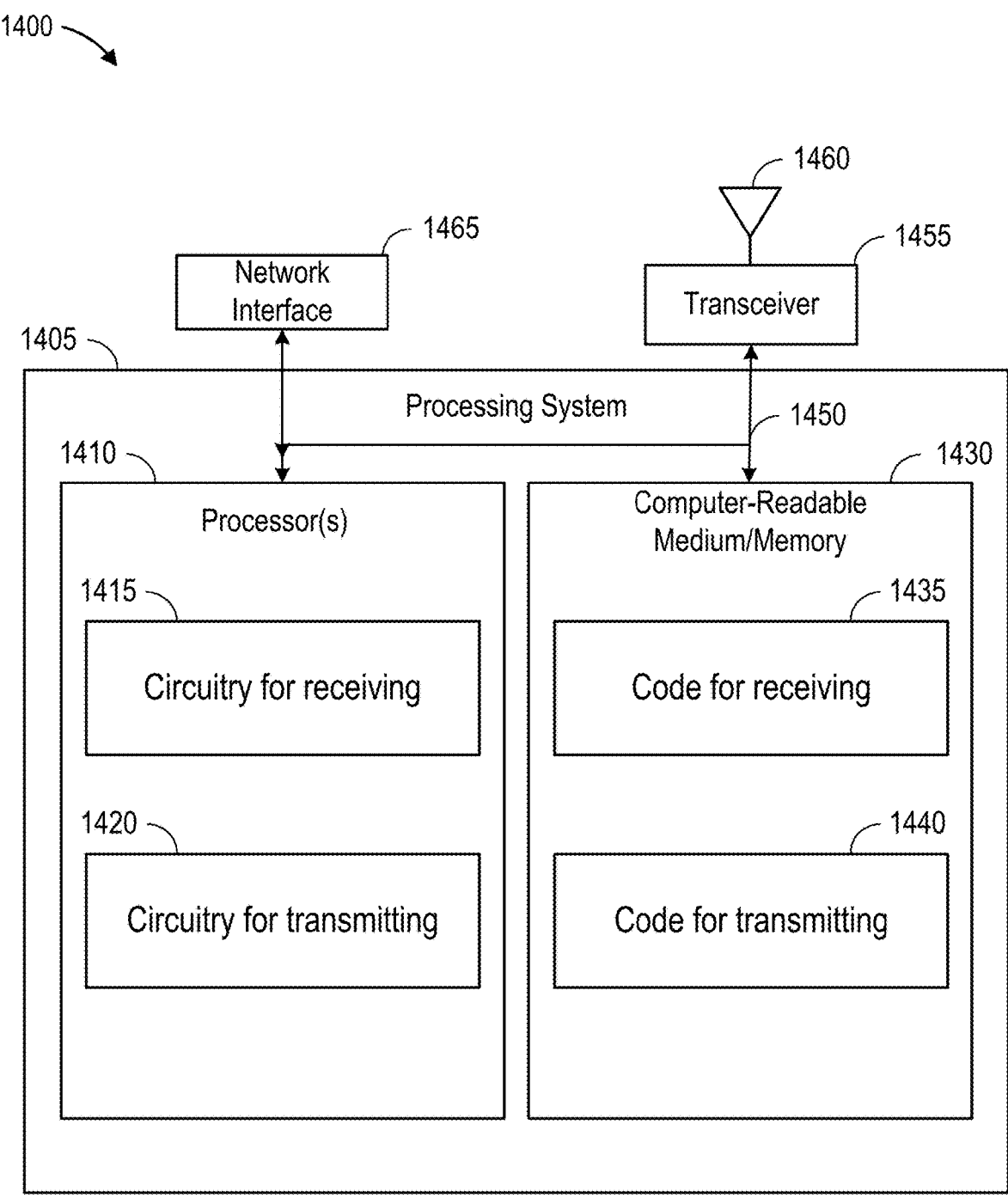

In one aspect, the method 1200, or any aspect related to it, may be performed by an apparatus, such as a communications device 1400 of FIG. 14, which includes various components operable, configured, or adapted to perform the method 1200. The communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment (UE), such as UE 104 described above with respect to FIG. 1 and FIG. 3.

The communications device 1300 includes a processing system 1305 coupled to a transceiver 1345 (e.g., a transmitter and/or a receiver). The transceiver 1345 is configured to transmit and receive signals for the communications device 1300 via an antenna 1350, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1325 via a bus 1340. In certain aspects, the computer-readable medium/memory 1325 is configured to store instructions (e.g., computer-executable code) that when executed by the one or more processors 1310, cause the one or more processors 1310 to perform the method 1100 described with respect to FIG. 11, and/or any aspect related to it. Note that reference to a processor performing a function of communications device 1300 may include the one or more processors 1310 performing that function of communications device 1300.

In the depicted example, computer-readable medium/memory 1325 stores code (e.g., executable instructions), such as code for generating 1330 and code for transmitting 1335. Processing of the code for generating 1330 and the code for transmitting 1335 may cause the communications device 1300 to perform the method 1100 described with respect to FIG. 11, and/or any aspect related to it.

The one or more processors 1310 include circuitry configured to implement (e.g., execute) the code stored in the computer-readable medium/memory 1325, including circuitry such as circuitry for generating 1315 and circuitry for transmitting 1320. Processing with the circuitry for generating 1315 and the circuitry for transmitting 1320 may cause the communications device 1300 to perform the method 1100 described with respect to FIG. 11, and/or any aspect related to it.

Various components of the communications device 1300 may provide means for performing the method 1100 described with respect to FIG. 11, and/or any aspect related to it. For example, means for transmitting, sending or outputting for transmission may include transceivers 354 and/or antenna(s) 352 of the UE 104 illustrated in FIG. 3 and/or the code for transmitting 1335, the circuitry for transmitting 1320, the transceiver 1345 and the antenna 1350 of the communications device 1300 in FIG. 13. Means for generating may include processors, transceivers 354 and/or antenna(s) 352 of the UE 104 illustrated in FIG. 3 and/or the code for generating 1330, the circuitry for generating 1315, the transceiver 1345 and the antenna 1350 of the communications device 1300 in FIG. 13.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 13 is an example, and many other examples and configurations of communication device 1300 are possible.

FIG. 14 depicts aspects of an example communications device 1400. In some aspects, communications device 1400 is a network entity, such as BS 102 of FIG. 1 and FIG. 3, or a disaggregated base station as discussed with respect to FIG. 2.

The communications device 1400 includes a processing system 1405 coupled to a transceiver 1455 (e.g., a transmitter and/or a receiver) and/or a network interface 1465. The transceiver 1455 is configured to transmit and receive signals for the communications device 1400 via an antenna 1460, such as the various signals as described herein. The network interface 1465 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1200 described with respect to FIG. 12, or any aspect related to it. Note that reference to a processor of communications device 1400 performing a function may include the one or more processors 1410 of communications device 1400 performing that function.

In the depicted example, the computer-readable medium/memory 1430 stores code (e.g., executable instructions), such as code for receiving 1435 and code for transmitting 1440. Processing of the code for receiving 1435 and the code for transmitting 1440 may cause the communications device 1400 to perform the method 1200 described with respect to FIG. 12, or any aspect related to it.

The one or more processors 1410 include circuitry configured to implement (e.g., execute) the code stored in the computer-readable medium/memory 1430, including circuitry such as circuitry for receiving 1415 and circuitry for transmitting 1420. Processing with the circuitry for receiving 1415 and the circuitry for transmitting 1420 may cause the communications device 1400 to perform the method 1200 described with respect to FIG. 12, or any aspect related to it.

Various components of the communications device 1400 may provide means for performing the method 1200 described with respect to FIG. 12, or any aspect related to it. Means for transmitting, sending or outputting for transmission may include transceivers 332 and/or antenna(s) 334 of the BS 102 illustrated in FIG. 3 and/or the circuitry for transmitting 1420, the code for transmitting 1440, the transceiver 1455 and the antenna 1460 of the communications device 1400 in FIG. 14. Means for receiving or obtaining may include transceivers 332 and/or antenna(s) 334 of the BS 102 illustrated in FIG. 3 and/or the circuitry for receiving 1415, the code for receiving 1435, the transceiver 1455 and the antenna 1460 of the communications device 1400 in FIG. 14.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 14 is an example, and many other examples and configurations of communication device 1400 are possible.

EXAMPLE CLAUSES

Implementation examples are described in the following numbered clauses:

Clause 1: A method for wireless communications at a user equipment (UE), comprising: generating a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmitting the DSR.

Clause 2: The method of clause 1, wherein the at least one RDB parameter comprises at least one of: a first RDB for the first traffic flow on a first logical channel; the first RDB and the maximum synchronization threshold; a second RDB for the second traffic flow on a second logical channel; or the second RDB and the maximum synchronization threshold.

Clause 3: The method of any one of clauses 1-2, wherein the maximum synchronization threshold indicates a maximum allowable delay time for delivery of a set of data packets of one traffic flow of the at least two traffic flows with respect to delivery of a set of data packets of another traffic flow of the at least two traffic flows.

Clause 4: The method of any one of clauses 1-3, wherein each traffic flow comprises data packets belonging to at least one of: one or more protocol data units (PDUs) or one or more PDU sets.

Clause 5: The method of any one of clauses 1-4, wherein: the first traffic flow comprises a first set of data packets of a first data type; the second traffic flow comprises a second set of data packets of a second data type; and the first data type is different from the second data type.

Clause 6: The method of any one of clauses 1-5, wherein: the at least one RDB parameter comprises a first RDB for the first traffic flow on a first logical channel, and a second RDB for the second traffic flow on a second logical channel is based on the first RDB.

Clause 7: The method of any one of clauses 1-6, wherein: the at least one RDB parameter comprises a second RDB for the second traffic flow on a second logical channel, and a first RDB for the first traffic flow on a first logical channel is based on the second RDB.

Clause 8: The method of clause 2, wherein: the first RDB indicates a first duration of remaining time for delivery of a first set of data packets of the first traffic flow; and the second RDB indicates a second duration of remaining time for delivery of a second set of data packets of the second traffic flow.

Clause 9: The method of clause 8, wherein a reference time for the first duration of remaining time is based on: a transmission time of the first set of data packets or a transmission time of the second set of data packets along with the maximum synchronization threshold.

Clause 10: The method of clause 8, wherein a reference time for the second duration of remaining time is based on: a transmission time of the second set of data packets or a transmission time of the first set of data packets along with the maximum synchronization threshold.

Clause 11: The method of any one of clauses 1-10, wherein: the at least one RDB parameter comprises a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

Clause 12: The method of any one of clauses 1-11, further comprising transmitting a separate buffer status report (BSR) for each of the logical channels or a single BSR for all the logical channels.

Clause 13: A method for wireless communications at a network entity, comprising: receiving a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmitting scheduling information for uplink transmissions in accordance with the DSR.

Clause 14: The method of clause 13, wherein the at least one RDB parameter comprises at least one of: a first RDB for the first traffic flow on a first logical channel; the first RDB and the maximum synchronization threshold; a second RDB for the second traffic flow on a second logical channel; or the second RDB and the maximum synchronization threshold.

Clause 15: The method of any one of clauses 13-14, wherein the maximum synchronization threshold indicates a maximum allowable delay time for delivery of a set of data packets of one traffic flow of the at least two traffic flows with respect to delivery of a set of data packets of another traffic flow of the at least two traffic flows.

Clause 16: The method of any one of clauses 13-15, wherein each traffic flow comprises data packets belonging to at least one of: one or more protocol data units (PDUs) or one or more PDU sets.

Clause 17: The method of any one of clauses 13-16, wherein: the first traffic flow comprises a first set of data packets of a first data type; the second traffic flow comprises a second set of data packets of a second data type; and the first data type is different from the second data type.

Clause 18: The method of any one of clauses 13-17, wherein: the at least one RDB parameter comprises a first RDB for the first traffic flow on a first logical channel, and a second RDB for the second traffic flow on a second logical channel is based on the first RDB.

Clause 19: The method of any one of clauses 13-18, wherein: the at least one RDB parameter comprises a second RDB for the second traffic flow on a second logical channel, and a first RDB for the first traffic flow on a first logical channel is based on the second RDB.

Clause 20: The method of clause 14, wherein: the first RDB indicates a first duration of remaining time for delivery of a first set of data packets of the first traffic flow; and the second RDB indicates a second duration of remaining time for delivery of a second set of data packets of the second traffic flow.

Clause 21: The method of clause 20, wherein a reference time for the first duration of remaining time is based on: a transmission time of the first set of data packets or a transmission time of the second set of data packets along with the maximum synchronization threshold.

Clause 22: The method of clause 20, wherein a reference time for the second duration of remaining time is based on: a transmission time of the second set of data packets or a transmission time of the first set of data packets along with the maximum synchronization threshold.

Clause 23: The method of any one of clauses 13-22, wherein: the at least one RDB parameter comprises a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

Clause 24: The method of any one of clauses 13-23, further comprising receiving a separate buffer status report (BSR) for each of the logical channels or a single BSR for all the logical channels.

Clause 25: An apparatus, comprising: a memory comprising executable instructions; and one or more processors configured, individually or in any combination, to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), comprising:

a memory comprising instructions; and one or more processors configured, individually or in any combination, to execute the instructions and cause the apparatus to:

generate a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmit the DSR.

2. The apparatus of claim 1, wherein the at least one RDB parameter comprises at least one of:

a first RDB for the first traffic flow on a first logical channel;

the first RDB and the maximum synchronization threshold;

a second RDB for the second traffic flow on a second logical channel; or the second RDB and the maximum synchronization threshold.

3. The apparatus of claim 1, wherein the maximum synchronization threshold indicates a maximum allowable delay time for delivery of a set of data packets of one traffic flow of the at least two traffic flows with respect to delivery of a set of data packets of another traffic flow of the at least two traffic flows.

4. The apparatus of claim 1, wherein each traffic flow comprises data packets belonging to at least one of: one or more protocol data units (PDUs) or one or more PDU sets.

5. The apparatus of claim 1, wherein:

the first traffic flow comprises a first set of data packets of a first data type;

the second traffic flow comprises a second set of data packets of a second data type; and the first data type is different from the second data type.

6. The apparatus of claim 1, wherein:

the at least one RDB parameter comprises a first RDB for the first traffic flow on a first logical channel, and a second RDB for the second traffic flow on a second logical channel is based on the first RDB.

7. The apparatus of claim 1, wherein:

the at least one RDB parameter comprises a second RDB for the second traffic flow on a second logical channel, and a first RDB for the first traffic flow on a first logical channel is based on the second RDB.

8. The apparatus of claim 2, wherein:

the first RDB indicates a first duration of remaining time for delivery of a first set of data packets of the first traffic flow; and the second RDB indicates a second duration of remaining time for delivery of a second set of data packets of the second traffic flow.

9. The apparatus of claim 8, wherein a reference time for the first duration of remaining time is based on: a transmission time of the first set of data packets or a transmission time of the second set of data packets along with the maximum synchronization threshold.

10. The apparatus of claim 8, wherein a reference time for the second duration of remaining time is based on: a transmission time of the second set of data packets or a transmission time of the first set of data packets along with the maximum synchronization threshold.

11. The apparatus of claim 1, wherein:

the at least one RDB parameter comprises a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

12. The apparatus of claim 1, wherein the one or more processors are configured, individually or in any combination, to execute the instructions and cause the apparatus to transmit a separate buffer status report (BSR) for each of the logical channels or a single BSR for all the logical channels.

13. An apparatus for wireless communications at a network entity, comprising:

a memory comprising instructions; and one or more processors configured, individually or in any combination, to execute the instructions and cause the apparatus to:

receive a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmit scheduling information for uplink transmissions in accordance with the DSR.

14. The apparatus of claim 13, wherein the at least one RDB parameter comprises at least one of:

a first RDB for the first traffic flow on a first logical channel;

the first RDB and the maximum synchronization threshold;

a second RDB for the second traffic flow on a second logical channel; or the second RDB and the maximum synchronization threshold.

15. The apparatus of claim 13, wherein the maximum synchronization threshold indicates a maximum allowable delay time for delivery of a set of data packets of one traffic flow of the at least two traffic flows with respect to delivery of a set of data packets of another traffic flow of the at least two traffic flows.

16. The apparatus of claim 13, wherein each traffic flow comprises data packets belonging to at least one of: one or more protocol data units (PDUs) or one or more PDU sets.

17. The apparatus of claim 13, wherein:

the first traffic flow comprises a first set of data packets of a first data type;

the second traffic flow comprises a second set of data packets of a second data type; and the first data type is different from the second data type.

18. The apparatus of claim 13, wherein:

the at least one RDB parameter comprises a first RDB for the first traffic flow on a first logical channel, and a second RDB for the second traffic flow on a second logical channel is based on the first RDB.

19. The apparatus of claim 13, wherein:

the at least one RDB parameter comprises a second RDB for the second traffic flow on a second logical channel, and a first RDB for the first traffic flow on a first logical channel is based on the second RDB.

20. The apparatus of claim 14, wherein:

the first RDB indicates a first duration of remaining time for delivery of a first set of data packets of the first traffic flow; and the second RDB indicates a second duration of remaining time for delivery of a second set of data packets of the second traffic flow.

21. The apparatus of claim 20, wherein a reference time for the first duration of remaining time is based on: a transmission time of the first set of data packets or a transmission time of the second set of data packets along with the maximum synchronization threshold.

22. The apparatus of claim 20, wherein a reference time for the second duration of remaining time is based on: a transmission time of the second set of data packets or a transmission time of the first set of data packets along with the maximum synchronization threshold.

23. The apparatus of claim 13, wherein:

the at least one RDB parameter comprises a first RDB for the first traffic flow on a first logical channel; and a scheduling time of data packets of the second traffic flow on a second logical channel is less than a value of the maximum synchronization threshold from a scheduling time of data packets of the first traffic flow on the first logical channel.

24. The apparatus of claim 13, wherein the one or more processors are configured, individually or in any combination, to execute the instructions and cause the apparatus to receive a separate buffer status report (BSR) for each of the logical channels or a single BSR for all the logical channels.

25. A method for wireless communications at a user equipment (UE), comprising:

generating a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmitting the DSR.

26. The method of claim 25, wherein the at least one RDB parameter comprises at least one of:

a first RDB for the first traffic flow on a first logical channel;

the first RDB and the maximum synchronization threshold;

a second RDB for the second traffic flow on a second logical channel; or the second RDB and the maximum synchronization threshold.

27. The method of claim 25, wherein the maximum synchronization threshold indicates a maximum allowable delay time for delivery of a set of data packets of one traffic flow of the at least two traffic flows with respect to delivery of a set of data packets of another traffic flow of the at least two traffic flows.

28. A method for wireless communications at a network entity, comprising:

receiving a delay status report (DSR) for at least two traffic flows on different logical channels, wherein the at least two traffic flows have a maximum synchronization threshold between each other, and wherein the DSR comprises at least one remaining delay budget (RDB) parameter related to an RDB of at least one of a first traffic flow or a second traffic flow and the maximum synchronization threshold; and transmitting scheduling information for uplink transmissions in accordance with the DSR.

29. The method of claim 28, wherein the at least one RDB parameter comprises at least one of:

a first RDB for the first traffic flow on a first logical channel;

the first RDB and the maximum synchronization threshold;

a second RDB for the second traffic flow on a second logical channel; or the second RDB and the maximum synchronization threshold.

30. The method of claim 28, wherein the maximum synchronization threshold indicates a maximum allowable delay time for delivery of a set of data packets of one traffic flow of the at least two traffic flows with respect to delivery of a set of data packets of another traffic flow of the at least two traffic flows.

* * * * *